United States Patent [19]

Dübal et al.

[11] Patent Number: 5,257,122
[45] Date of Patent: Oct. 26, 1993

[54] FERROELECTRIC LIQUID CRYSTAL DISPLAY HAVING GRAY STEPS OR A CONTINUOUS GRAY SCALE

[75] Inventors: Hans-Rolf Dübal, Königstein/Taunus; Claus Escher, Mühltal; Gerhard Illian, Frankfurt am Main, all of Fed. Rep. of Germany; Mikio Murakami, Kakegawa, Japan; Dieter Ohlendorf, Liederbach, Fed. Rep. of Germany

[73] Assignee: Hoechst Aktiengesellschaft, Frankfurt am Main, Fed. Rep. of Germany

[21] Appl. No.: 777,245

[22] PCT Filed: May 11, 1990

[86] PCT No.: PCT/EP90/00761
§ 371 Date: Nov. 27, 1991
§ 102(e) Date: Nov. 27, 1991

[87] PCT Pub. No.: WO90/15360
PCT Pub. Date: Dec. 13, 1990

[30] Foreign Application Priority Data

May 30, 1989 [DE] Fed. Rep. of Germany ....... 3917472

[51] Int. Cl.$^5$ ............................................ G02F 1/133
[52] U.S. Cl. .................................. 359/75; 359/82; 359/84; 359/87
[58] Field of Search ................. 359/75, 82, 84, 87, 359/93, 94, 99, 100

[56] References Cited

U.S. PATENT DOCUMENTS

| 3,954,325 | 5/1976 | Borden | 359/82 |
| 4,632,514 | 12/1986 | Ogawa et al. | 359/82 |
| 4,712,877 | 12/1987 | Okada et al. | 359/100 |
| 4,917,471 | 4/1990 | Takao et al. | 359/75 |
| 5,095,378 | 3/1992 | Suzuki | 359/93 |

FOREIGN PATENT DOCUMENTS

| 0152827 | 8/1985 | European Pat. Off. . |
| 0316708 | 5/1989 | European Pat. Off. . |
| 0357463 | 3/1990 | European Pat. Off. . |
| 0228124 | 9/1988 | Japan | 359/100 |

Primary Examiner—William L. Sikes
Assistant Examiner—Huy K. Mai
Attorney, Agent, or Firm—Curtis, Morris & Safford

[57] ABSTRACT

A ferroelectric liquid crystal switching or display device, in which the liquid crystal film has a constant thickness, wherein one of the glass sheets in the device is planar and the other glass sheet has at least one step. The switching or display device of the present invention does not require shortened switching times or more contacts or drivers and does not show unwanted switching.

6 Claims, 6 Drawing Sheets

FERROELECTRIC LIQUID CRYSTAL DISPLAY HAVING GRAY STEPS OR A CONTINUOUS GRAY SCALE

DESCRIPTION

As is known, ferroelectric liquid crystals are suitable as switchable medium, inter alia, for the production of high-resolution matrix displays for computers, graphics and TV monitors, since they have short switching times and steep electrooptical characteristics. As is known, a ferroelectric liquid crystal display (hereinafter FLC display) is constructed as follows: it is composed of two glass or plastic sheets which are provided with a conductive and transparent layer in such a manner that one side has horizontal strips of this layer (so-called line electrodes or simply "lines") and on the other side vertical strips (column electrodes or simply "columns") are present.

Between the two sheets, the liquid crystal layer is present, which has uniform orientation by virtue of one or two orientation layers. As a rule, orientation layers are thin polymer films, which, after a special surface treatment, such as, for example after rubbing or roughening, align the longitudinal axes of the liquid crystals homogeneously. However, the orientation layers can also be composed of inorganic materials, such as, for example, silicon oxide, and orientated by other processes, such as, for example, vapor deposition at an angle. In addition, one or two polarization films and usually a color filter matrix are required for color display. Furthermore, passivating, antireflection and other layers can be present.

As is known, FLC displays are highly suitable for displaying highly resolved black and white pictures or monochrome pictures. Since these displays utilize a bistable medium (the ferroelectric liquid crystal), only two states, depending on the direction of the externally applied field, are stable and can be assigned, if a suitable display construction is chosen, to the brightness values black and white. Intermediate brightness values, so-called gray values or gray steps, can, however, not be obtained in practice, since these states are unstable.

On the other hand, for a complete picture, in particular color picture, display, these gray values are necessary. This is why the problem of gray steps for FLC displays has previously been investigated by many research groups worldwide. A review of the present state of the art is given by Leroux et. al. in Proceedings of the 1988 International Display Research Conference, San Diego, pages 111-113.

The processes for producing gray steps can be divided into three groups

In integration over time, an image point is very rapidly switched between black and white, so that the eye perceives a gray value whose brightness depends on the relative number of white periods. This process has the disadvantage that extremely high, currently unattainable demands are made on the switching time of the liquid crystals for matrix display.

In integration over space, the individual image points are subdivided into smaller areas or several image points are combined to give a single one. Their degree of brightness is given by the relative number of areas switched to white.

This process has the disadvantage that it greatly increases the number of electric contacts and of the electronic driver ICs (integrated circuits) required, making the manufacture of the displays more difficult and considerably more expensive.

A further process neither requires shorter switching times nor more contacts and drivers, but instead utilizes the variation in thickness of the FLC layer. If the thickness of the liquid crystal layer is varied on each individual image point by varying the thickness of, for example, the orientation layer or by, for example, stairlike structures of the electrodes, the electric field which switches the liquid crystal is affected by an image point according to the equation $=(E=U_{LC}/d)$, in which $U_{LC}$ is the voltage directly applied to the liquid crystal and d is the liquid crystal film thickness of the subarea of an image point. If the film thicknesses $d_1$, $d_2$, $d_3$ etc. within an image point differ (for example $d_1 < d_2 < d_3$), the electric fields obtained are $E_1 = U_{LC}/d_1$, $E_2 = U_{LC}/d_2$, $E_2 = U_{LC}/d_3$, etc. Upon continuous increase of the $U_{LC}$, first the subarea having the thinnest FLC film ($d_1$), is switched, while the subarea with the next higher thickness ($d_2$) is only switched upon further increase of the $U_{LC}$, and finally the subarea having the greatest thickness ($d_3$) is switched upon further increase of the $U_{LC}$. This means that the brightness of the image point can be increased stepwise by switching.

This process described in U.S. Pat. No. 4,712,877 does not require very short switching times nor additional contacts and drivers, but has the disadvantage that the change in the thickness of the liquid crystal layer also changes the birefringence and thus the color of the image point. This means that the subareas are switched over at different external threshold voltages although they have different colors. This severely limits the color capability of such an FLC display. If, for example, an FLC display is filled with an FLC mixture having a $\Delta n$ of 0.13 ($\Delta n$ is the difference between the refractive indices n. and $n_\perp$), the right state of the display shows up in white at a film thickness of $d_1$ of 2 $\mu m$. In order to increase the threshold voltage by 10%, the layer thickness must increase to a $d_2$ of 2.2 $\mu m$. However, the subarea having a $d_2$ of 2.2 $\mu m$ then has an undesirable yellowish color.

The object of the present invention is a process for producing gray steps for liquid crystal displays, in particular FLC displays, which does not require shortened switching times nor more contacts or drivers and does not lead to unwanted color switching.

Color switching can only be prevented if the thickness of the liquid crystal layer remains constant over the entire switching range of the display, ie. for all image points On the other hand, it must be possible — if it is desired not to use more connections and drivers or shorter switching times — to vary the effective electric field across an image point over space. Accordingly, the present invention is based on the division of an image point (which usually has a dimension of about 50 to 1000 $\mu m$) into subareas or zones in which the effective electric field at a constant external voltage varies but the liquid crystal film thickness does not.

BRIEF DESCRIPTION OF THE DRAWINGS

The following detailed description, giving by way of example but not intended to limit the invention solely to the specific embodiment described, may best be understood in conjunction with the accompanying drawings, in which:

FIG. 1 shows the structure of such an image point by way of example. The upper glass sheet (1) is planar. It is coated with a conductive transparent layer (2) and an orientation layer (3). The lower glass sheet (4) has at least one step and in this case two subareas A and B per image point. The orientation layer (3') is then applied on top of the conductive layer (2') in such a manner that it compensates the step, as a result of which the thickness of the liquid crystal film (5) remains constant.

FIG. 2 shows a simplified electric circuit diagram of this image point. U is the external voltage, i.e. the one applied to the electrodes. A and B are the two subareas in FIG. 1. The indices 1 and 2 refer to the liquid crystal layer and to the orientation layer. Since the liquid crystal film thickness is constant, the capacitances $C_1^A$ and $C_1^B$ are equal if the subareas are equal. Since the orientation layers have different thicknesses, $C_2^A$ is not equal to $C_2^B$ (in the case of FIG. 1, $C_2^A$ is smaller than $C_2^A$). The effective electric fields in the subareas A and B are described by the following equations:

$$E_1^A = U_1^A/d_1 \quad (1)$$

$$E_1^b = U_1^B/d_1 \quad (2)$$

Figure 1:
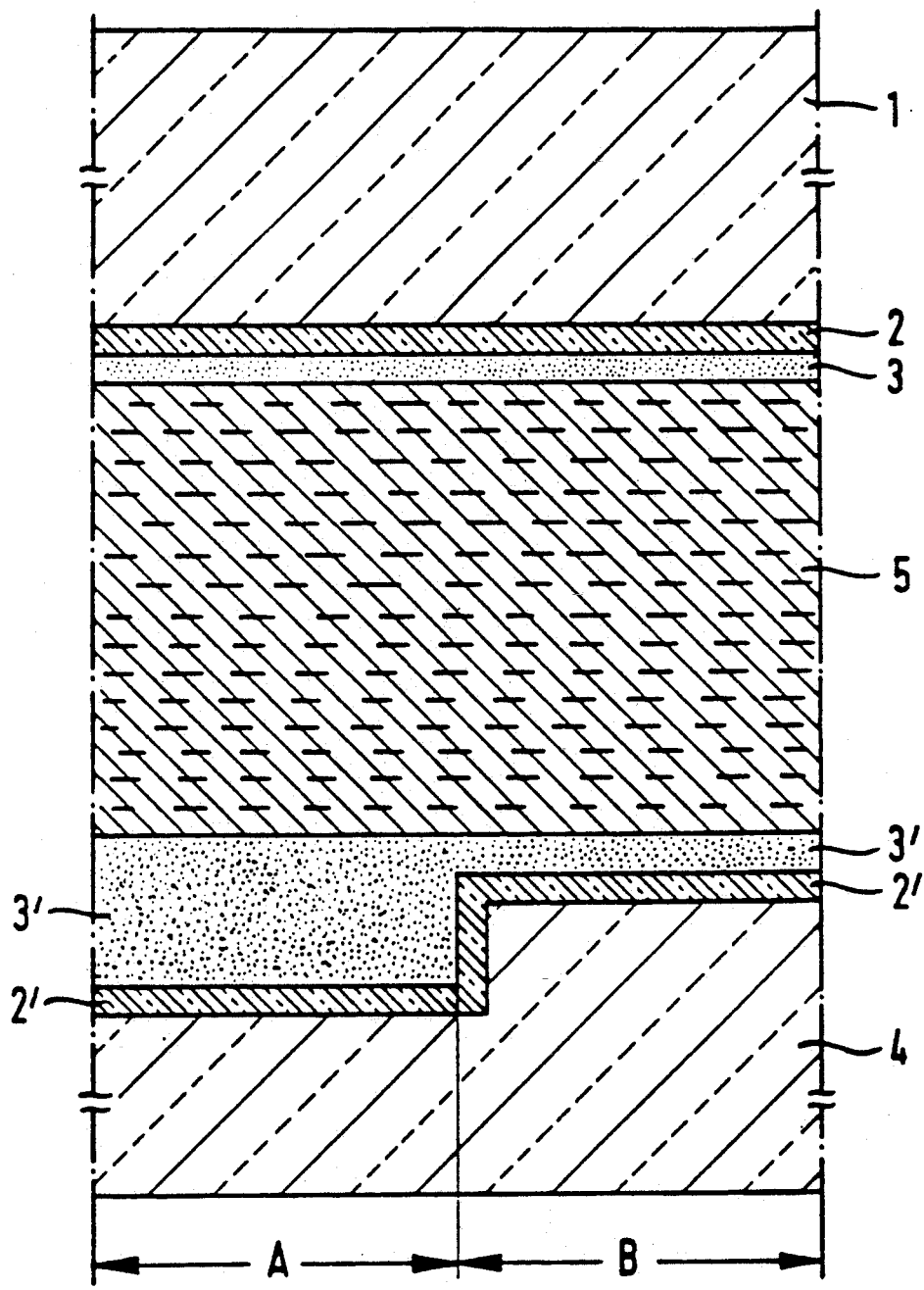
FIG. 1 is a cross-sectional representation of an image point of a liquid-crystal display in accordance with the teachings of the present invention.
Figure 2:
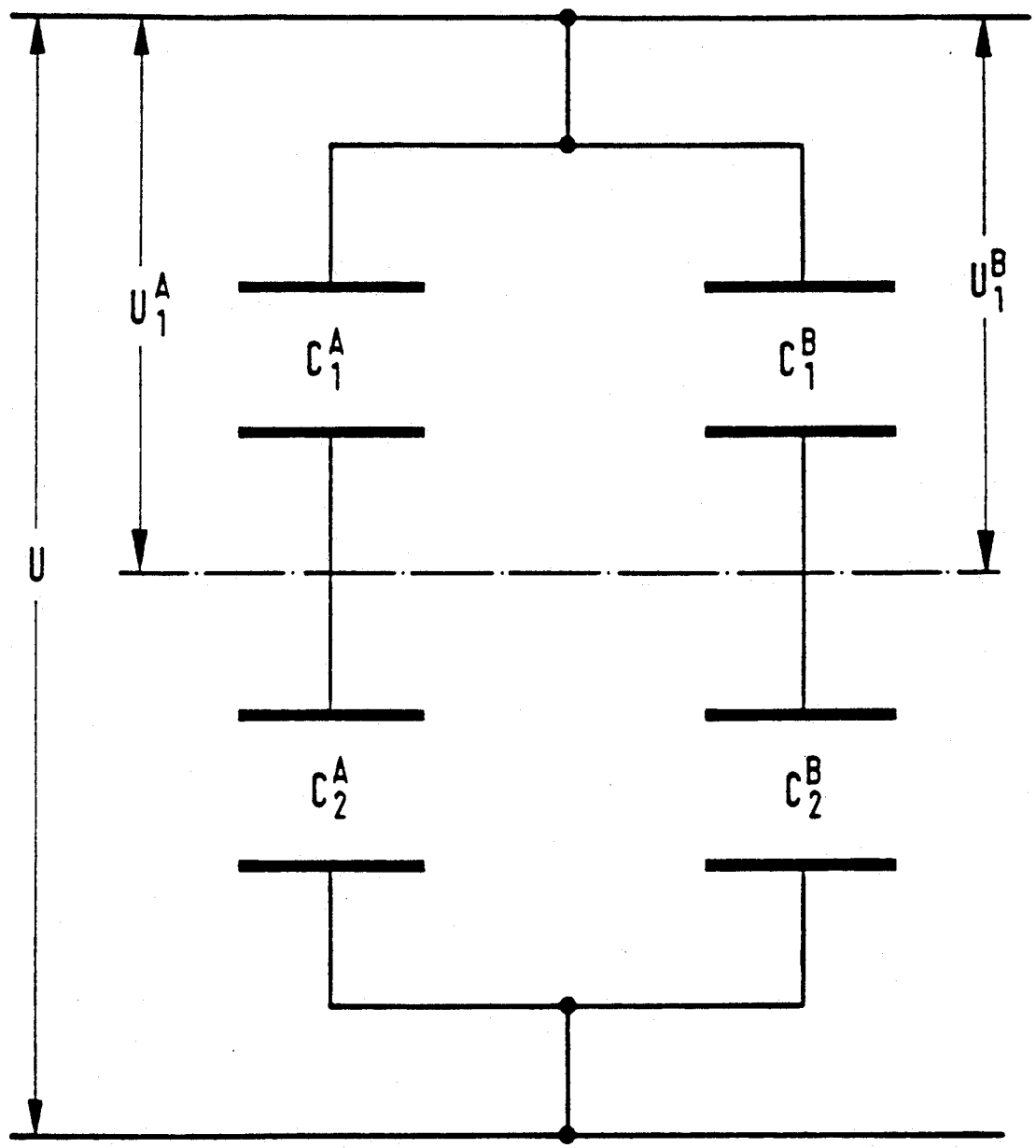
FIG. 2 is a schematic representation of an electric circuit diagram of the image point of FIG. 1.

in which $d_1$ is the thickness of the liquid crystal films. When connected in series, the voltages $U_1^A$ and $U_1^B$ are given by:

$$U_1^A = \frac{C_2^A}{C_1^A + C_2^A} U \quad (3)$$

$$U_1^B = \frac{C_2^B}{C_1^B + C_2^B} U \quad (4)$$

The formula for a single plate capacitor:

$$C_1^A = \epsilon_0 \frac{\epsilon_1 A^A}{d_1} \quad (5)$$

$$C_1^B = \epsilon_0 \frac{\epsilon_1 A^B}{d_1} \quad (6)$$

$$C_2^A = \epsilon_0 \frac{\epsilon_2 A^A}{d_2^A} \quad (7)$$

$$C_2^B = \epsilon_0 \frac{\epsilon_2 A^B}{d_1^B} \quad (8)$$

can be applied to all capacitances appearing in eq. (3) and (4).

The electric fields acting on the liquid crystal are given by eq. (1) to (8):

$$E_1^A = \frac{(U/d_1)}{1 + \frac{\epsilon_1 d_2^A}{d_1 \epsilon_2}} \quad (9)$$

$$E_1^B = \frac{(U/d_1)}{1 + \frac{\epsilon_1 d_2^B}{d_1 \epsilon_2}} \quad (10)$$

These observations lead to a number of conclusions which are essential for application. Firstly, at the same external voltage, the effective fields $E_1^A$ and $E_1^B$ in the subareas A and B are different. The subarea in which the ratio ($\epsilon_1 d_2/\epsilon_2 d_1$) is smaller will be switched first, i.e., according to FIG. 1, subarea B which has the thinner orientation layer. This means that the two subareas have different values for the threshold voltages. The subarea having the thicker orientation layer will also be switched over, but only when the external voltage is increased. The brightness (H) is plotted in FIG. 3 on the ordinate and the voltage (U) on the abscissa. The image point constructed according to FIG. 1 thus gives three brightness levels (for example black-gray-white) between crossed polarizers but no change in color.

Secondly, the threshold voltages do not depend on the size of the subareas $A^A$ and $A^B$ or their ratio. This makes it possible to regulate the brightness level by varying the subareas without having to accept a change in the threshold voltages.

Figure 3:
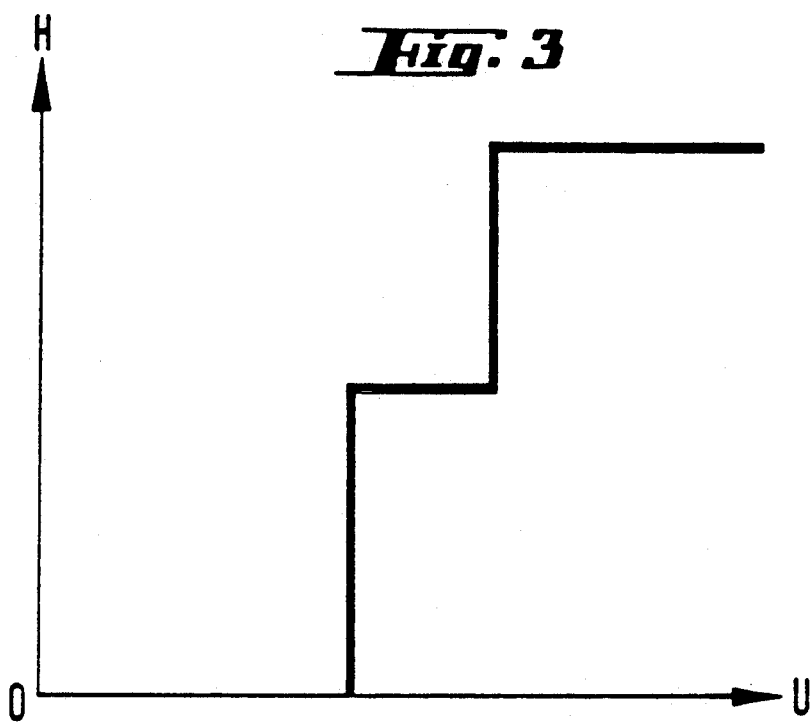
FIG. 3 is a plot of brightness (H) as a function of voltage (U) for the image point of FIG. 1.
Figure 4:
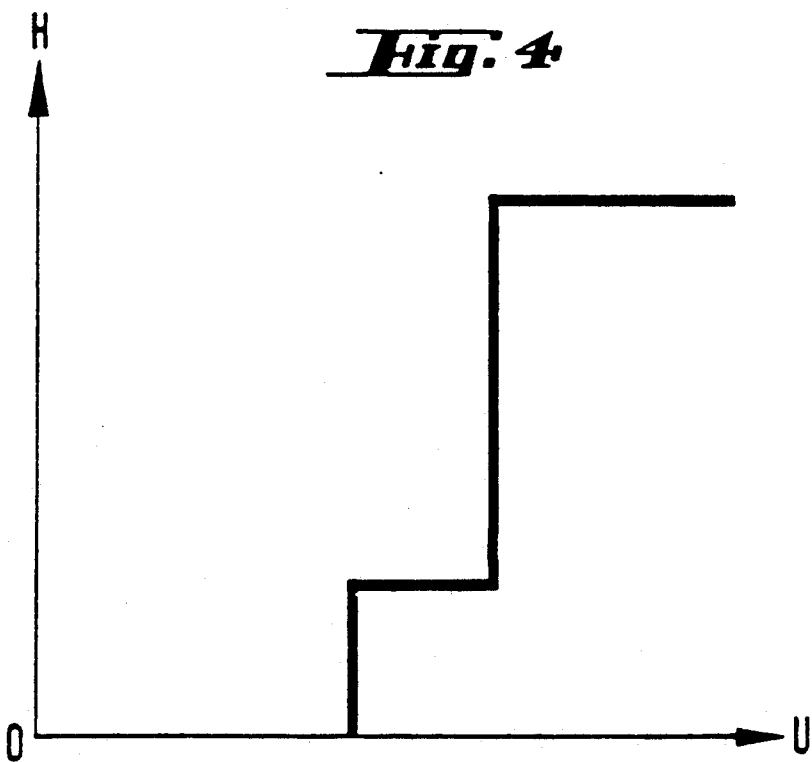
FIG. 4 is a plot of brightness (H) as a function of voltage (U) for an image point having an $A^A/A^B$ area ratio of 3:1.

FIG. 4 shows a characteristic for an $A^A/A^B$ area ratio of 3:1. Now a darker gray than in FIG. 3 is obtained.

Thirdly, at given liquid crystal values $\epsilon_1$ and $d_1$, the threshold voltages can be influenced according to the invention not only by varying $d_2$ (as in the above example) but also by varying the dielectric constant $\epsilon_2$ or a combination of $d_2$ and $\epsilon_2$. The thickness of the orientation layer can, for example, be identical in subareas A and B, but nevertheless different threshold voltages can be obtained in the two subareas and thus a gray step, by applying two different orientation layers having different dielectric constants $\epsilon_2^A$ and $\epsilon_2^B$.

The electrooptic characteristic of the FLC display can be influenced almost as desired by means of the process described. Via the division of the subareas, it is possible to obtain, for example, linear, square or logarithmic gray steps or even continuous gray scales.

The working examples listed below serve to illustrate the invention.

EXAMPLE 1

In order to demonstrate the gray steps, FLC test cells having an electrode surface area of 8 mm×4 mm are produced. To this end, commercially available glass sheets coated with indium/tin oxide are coated with polyamido-carboxylic acid solutions. These wet films are imidized and then rubbed using velvet, resulting in the formation of a polyimide orientation layer on each side of the glass. Using glass spacers 2 μm thick, the sheets of glass are joined in such a manner that the liquid crystal film thickness is exactly 2 μm. However, on one half of the demonstration image point, the polyimide film has a thickness of 20 nm (on both the upper and lower glass sheet), while the second half of the demonstration image point is coated with 100 nm of polyimide in each case. This demonstration display is filled with the commercially available ferroelectric LC mixture ®Felix-001 (manufactured by Hoechst AG, Frankfurt; described in Ferroelectrics 84, page 89 ff, 1988).

In order to detect the gray steps, the cell is placed between cross polarizers. Switching takes place by applying a series of voltage pulses at a temperature of 25° C., each of which are composed of a pair of bipolar pulses. The first pulse has an amplitude of ± 16V at a pulse width of 500 μs; the second pulse — delayed by 20 ms compared with the first one — has a pulse width of 200 μs at variable voltage amplitude and inverse polarity (see, for example, H.R. Dübal et al. Japanese Journal of Applied Physics Vol. 27, 12 (1988), 2241–2244).

The cell is placed in such a position that after the first pulse a dark state is obtained. As long as the amplitude of the second pulse is below 16.2 V, the dark state is retained: the image point is black. At 16.2 V, the subarea comprising the thin orientation layer is switched, while that comprising the thick orientation layer remains dark. The second subarea is also switched but only when 17.6 V are reached, so that the entire area is bright.

This means that the image point is
black, as long as the amplitude is less than 16.2 V
gray, in the range from 16.3 to 17.5 V
white, above 17.6 V.

Since the liquid crystal film has the same thickness in both cases, no differences in color are observed.

EXAMPLE 2

Figure 5:
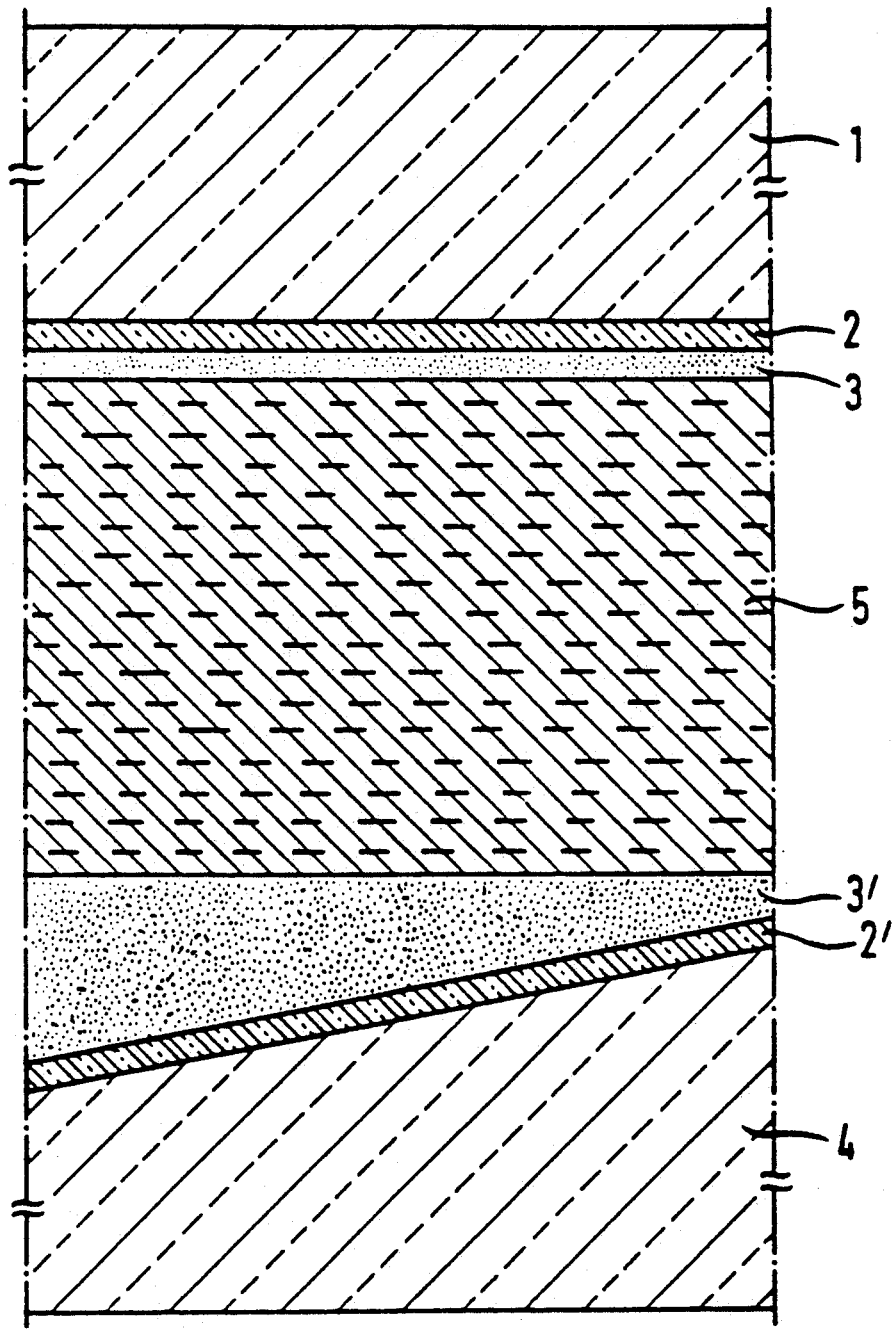
FIG. 5 is another cross-sectional representation of an image point of a liquid-crystal display in accordance with the teachings of the present invention.

Continuous gray steps can be obtained using a continuously changing orientation layer thickness or another dielectric layer between liquid crystal and electrode. FIG. 5 shows such an example, which leads to a flat adjustable gray steps. The meaning of the numbered layers s as described in the text (see FIG. 1).

EXAMPLE 3

Figure 6A:
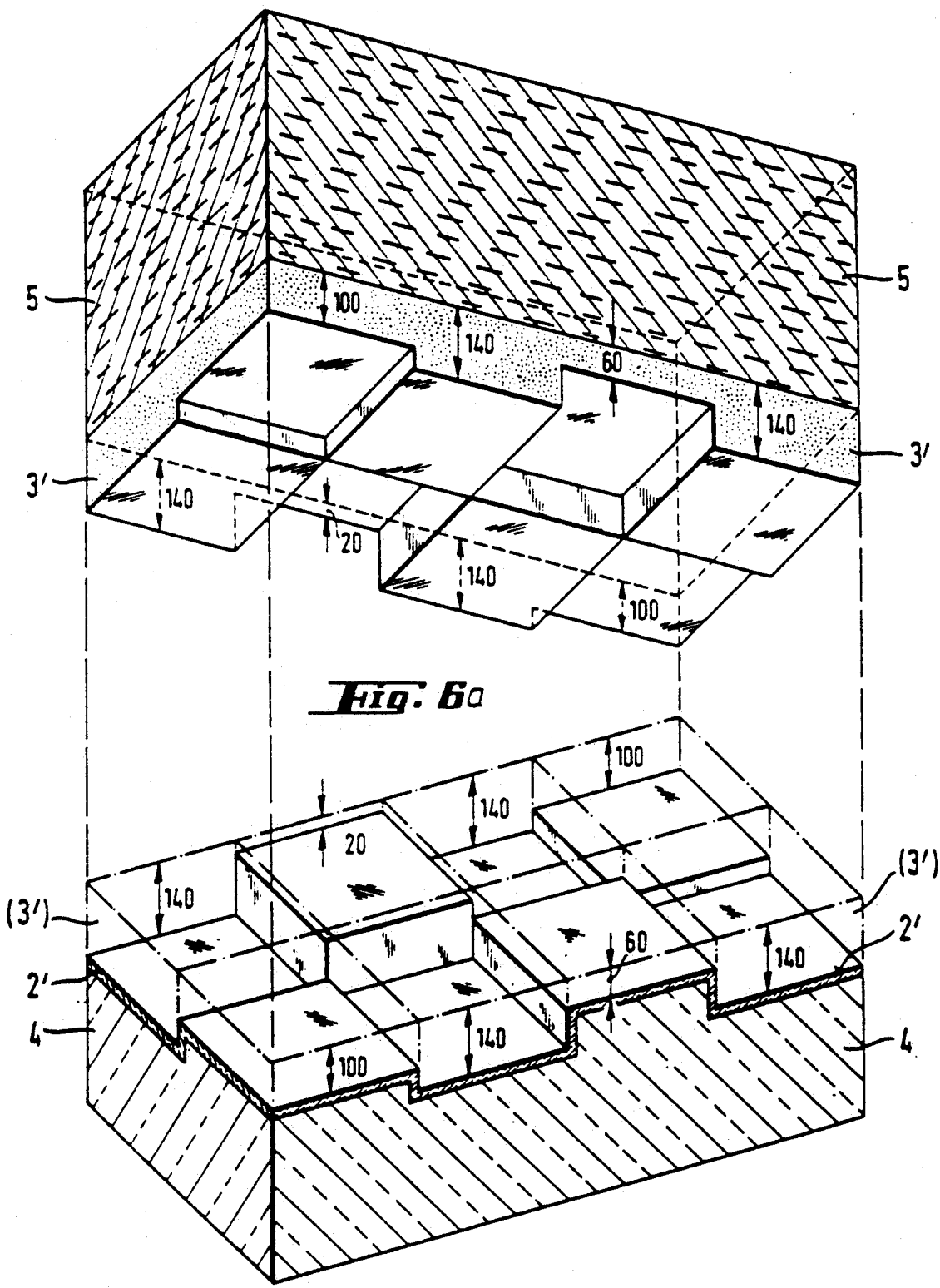
FIG. 6(a) is a perspective schematic representation of another image point structure in accordance with the teachings of the present invention having eight subareas.
Figure 6B:
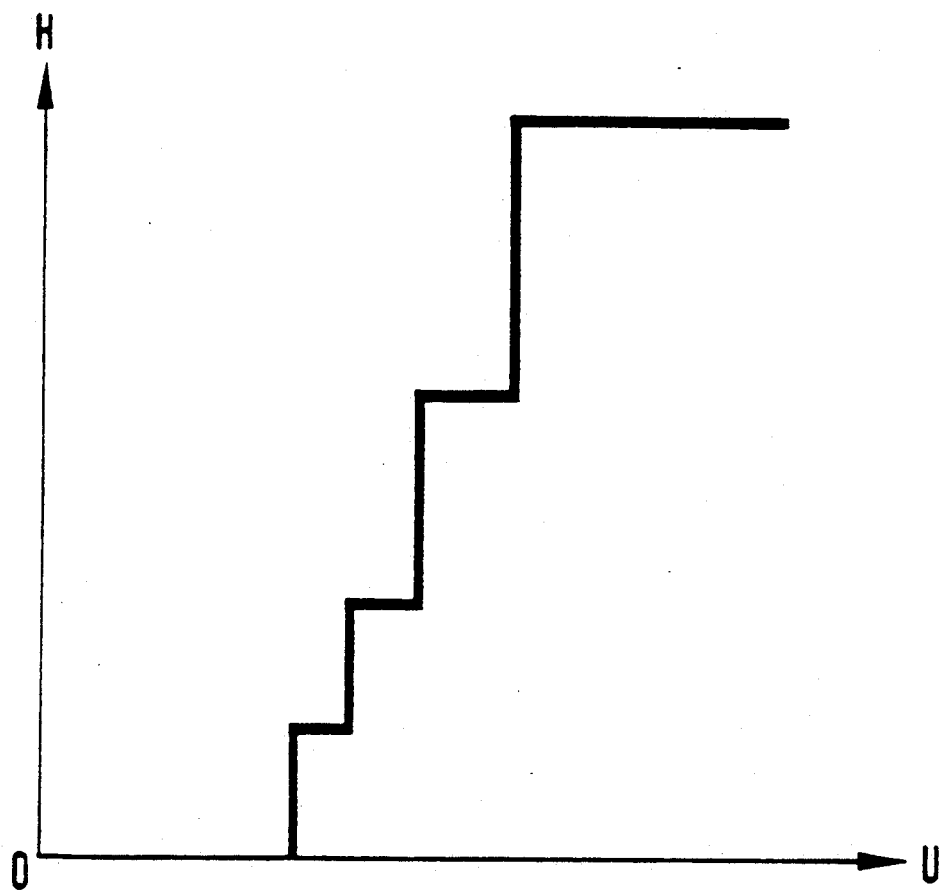
FIG. 6(b) is a plot of brightness (H) as a function of voltage (U) for the image point of FIG. 6(a).

FIG. 6(*a*) shows an image point structure according to the invention comprising eight subareas, for which the orientation layer thicknesses are given in nanometer units (20, 60, 100, 140 nm). Again, all subareas experience the same voltage U, and the liquid crystal film has a constant thickness over the entire area. In FIG. 6(*b*), the brightness of the image point is plotted as a function of the voltage. This gives exponentially increasing brightness levels.

Using the FLC test mixture ®Felix-1 used in Example 1, the threshold voltages and brightness values summarized in Table 1 are obtained at a temperature of 25° C. and a pulse width of 200 μs.

TABLE 1

| Exponentially increasing gray steps (for ® Felix-001, layer thickness 2.0 μm, 25° C.) | |
|---|---|
| Voltage range (in volt) | Rel. brightness or contrast (% of area switched over) |
| 0–16.1 | 0 (black) |
| 16.2–16.4 | 12.5 (dark gray) |
| 16.5–16.7 | 25 (gray) |
| 16.9–17.1 | 50 (light gray) |
| greater than 17.2 | 100 (white) |

We claim:

1. A ferroelectric liquid crystal switching or display device having a liquid crystal film between two sheets, in which the liquid crystal film has a constant thickness, and wherein one of the sheets in the device is planar and the other sheet has at least one step.

2. A ferroelectric liquid crystal switching or display device having a liquid crystal film between two sheets, said sheets having electrodes, and said device having an orientation layer between one sheet and the liquid crystal film, in which the liquid crystal film has a constant thickness, and wherein the thickness of the orientation layer and the distance between the electrodes is different across the area of an image point.

3. The device as claimed in claim 1, wherein the sheets are glass sheets.

4. The device as claimed in claim 1, wherein the sheets are plastic sheets.

5. The device as claimed in claim 2, wherein the sheets are glass sheets.

6. The device as claimed in claim 2, wherein the sheets are plastic sheets.

* * * * *